US006222859B1

(12) United States Patent
Yoshikawa

(10) Patent No.: US 6,222,859 B1
(45) Date of Patent: Apr. 24, 2001

(54) DATA COMMUNICATION METHOD, DATA COMMUNICATION TERMINAL, DATA COMMUNICATION SYSTEM AND COMMUNICATION CONTROL SYSTEM

(75) Inventor: Munehiro Yoshikawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/078,619

(22) Filed: May 14, 1998

(30) Foreign Application Priority Data

May 15, 1997 (JP) .................................................. 9-125663
May 26, 1997 (JP) .................................................. 9-134594

(51) Int. Cl.[7] ..................................................... H04J 3/12
(52) U.S. Cl. ............................................. 370/522; 370/464
(58) Field of Search ................................... 370/522, 498, 370/464, 465; 379/90.01, 93.01, 93.05, 100.17; 970/352, 351, 400, 401, 399, 389

(56) References Cited

U.S. PATENT DOCUMENTS

| 5,907,547 | * | 5/1999 | Foladare | 370/352 |
| 6,069,890 | * | 5/2000 | White | 370/389 |
| 6,078,582 | * | 6/2000 | Curry | 370/356 |
| 6,108,329 | * | 8/2000 | Oyama | 370/352 |
| 6,122,255 | * | 9/2000 | Bartholomew | 370/385 |

* cited by examiner

Primary Examiner—Douglas Olms
Assistant Examiner—Ricardo M. Pizarro
(74) Attorney, Agent, or Firm—Jay H. Maioli

(57) ABSTRACT

Prior to communication over the Internet and using a different line, a first terminal transmits to a second terminal a set of information including at least an IP address of the first terminal on the Internet. Based on the IP address thus transmitted separately, the party at the second terminal initiates communication over the Internet. This establishes direct end-to-end communication between the two terminals over the Internet. In a communication setup such as an Internet-based telephone call wherein address information about a desired party on the network is not previously known to a calling party, the inventive method allows the two parties to communicate directly with each other over the network on an end-to-end communication basis without recourse to a rendezvous server or like services.

20 Claims, 13 Drawing Sheets

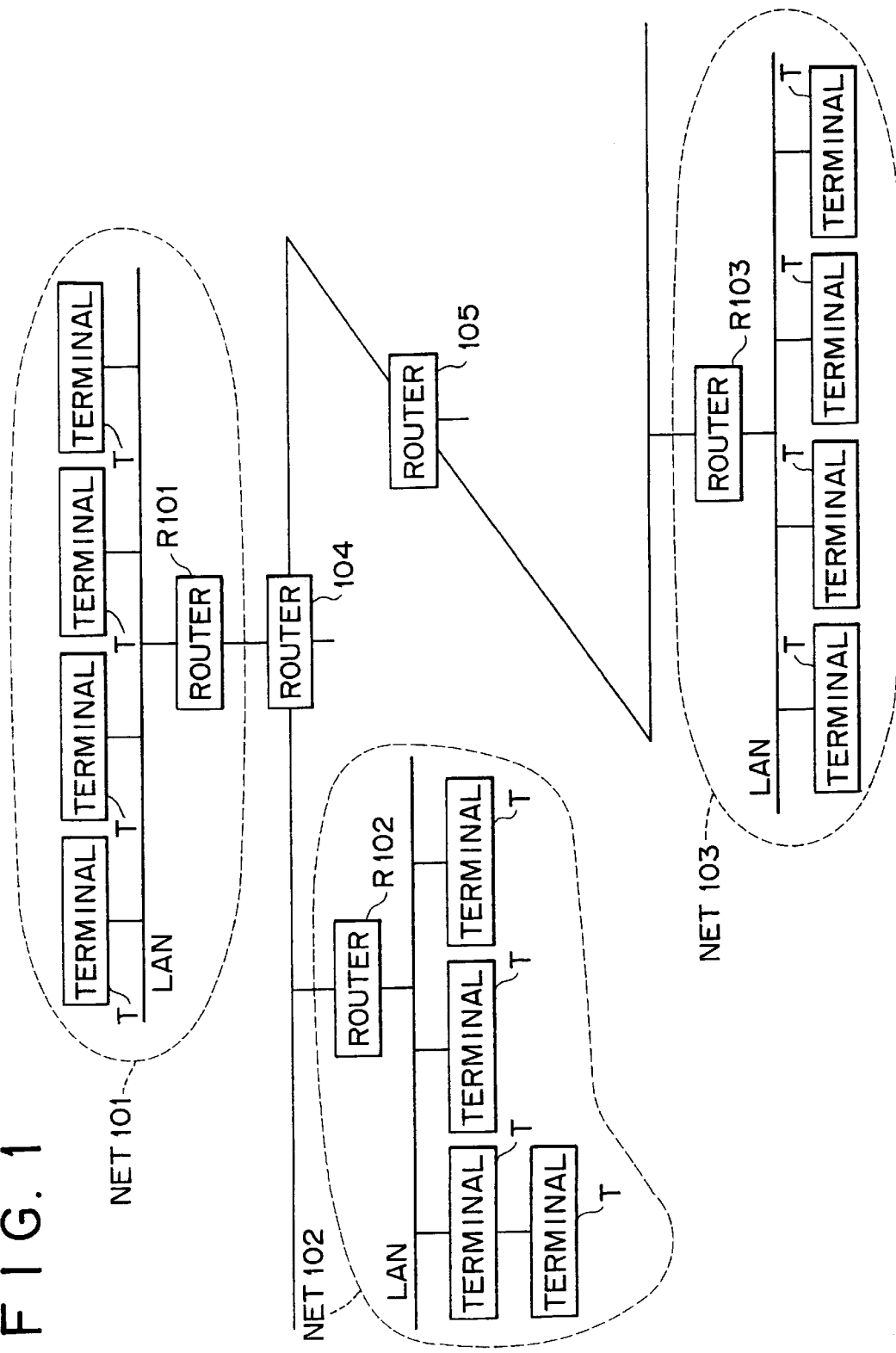
F I G. 1

CALLING PARTY

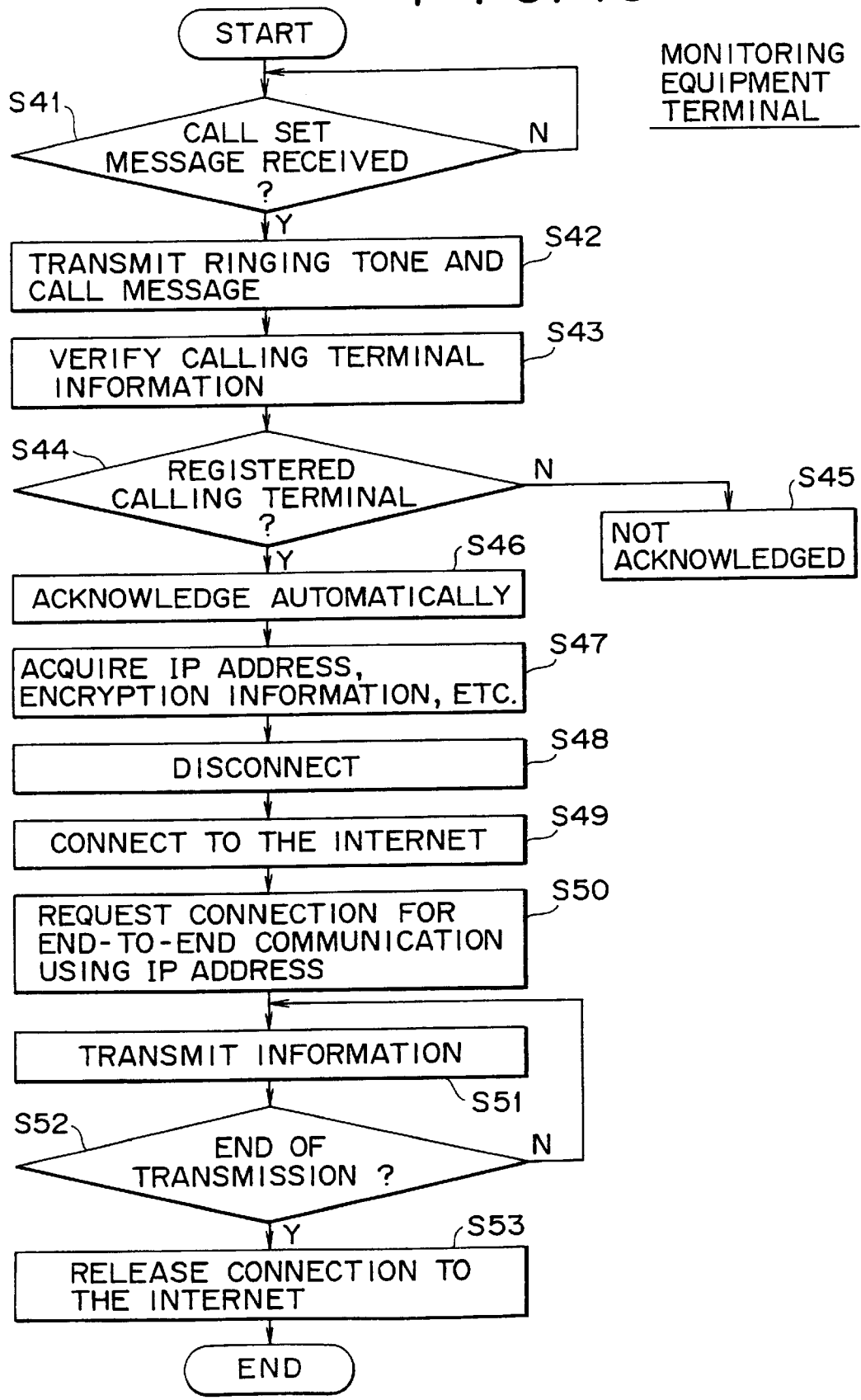

DATA COMMUNICATION METHOD, DATA COMMUNICATION TERMINAL, DATA COMMUNICATION SYSTEM AND COMMUNICATION CONTROL SYSTEM

BACKGROUND OF THE INVENTION

1. Field of the Invention

The present invention relates to a method and a terminal for communication over communication networks. More particularly, the invention relates to a method and a terminal for communication over a network having a low degree of privacy such as the Internet.

2. Description of the Related Art

The Internet is known as one of predominant networks connecting computers on a global scale. Specifically, the Internet is a computer network that interconnects wide area computer networks set up by corporations, universities and other institutions throughout the world. Diverse services such as electronic mail, file transfers and information searches are already available over the Internet.

FIG. 1 is an explanatory view outlining how the Internet is formed. In FIG. 1, portions enclosed by broken lines NET101, NET102, etc., represent computer networks. Each of the computer networks NET101, NET102, etc., has a plurality of terminals T. The terminals T on each computer network are connected to form a local area network (LAN). The LANs operate on a number of key principles such as the Ethernet and the token-ring.

The computer networks NET101, NET102, etc., are interconnected by means of routers R101, R102, etc. The routers R101, R102, etc., route data to their destinations between computer networks.

When the computer networks NET101, NET102, etc., are interconnected by the routers R101, R102, etc., in the manner described, they constitute a world-wide computer network called the Internet. The Internet allows the computer networks NET101, NET102, etc., around the world to exchange data therebetween.

The Internet typically utilizes the IP (Internet Protocol) as its network layer protocol. The IP involves assigning an IP address to each of the terminals configured on a network. All destinations to which data may be transferred are identified by IP addresses. An IP address comprises four groups of eight binary bits each, such as "43. 3. 25. 24. 6."

As the Internet expands ever wider, there is concern over an eventual shortage of IP addresses. On a network where a large number of terminals are registered but a relatively small number of them are actually connected at any one time, the IP address count may be economized as follows: The network is furnished with a server dedicated to assigning IP addresses to configured terminals. The server assigns IP addresses to terminals on the network only when they are actually connected. This arrangement eliminates the need for preparing as many IP addresses as all terminals on the network. A limited number of IP addresses may thus be utilized efficiently.

The Internet utilizes the TCP (Transmission Control Protocol) and the UDP (User Datagram Protocol) as its transport layer protocols. The TCP involves permitting communication after setting up what is known as a connection type communication link. The TCP offers such functions as packet sequencing, retransmission, flow control and congestion control. The UDP is a connectionless type protocol that is used in place of the TCP where there are real-time constraints. For example, digital audio communication is carried out in accordance with the UDP. In that case, the flow of audio data proceeds uninterrupted even if part of the packets involved drop out; retransmission of the missing packets is not requested under the UDP.

As mentioned, the Internet basically utilizes the TCP/IP protocols. Each of the terminals connected on a computer network is assigned an IP address for terminal identification. Packets are transferred between terminals according to the TCP or the UDP.

Individuals' personal computers are not always interconnected over a LAN. Without being connected to a LAN, these computers have no IP addresses. Where such individuals wish to join the Internet, they have recourse to an enterprise called an Internet service provider (called the ISP hereunder). Via the ISP, an individual's computer hooks up to a telephone line connected to a computer network which in turn is linked to the Internet in accordance with the PPP (Point-to-Point Protocol) and the SLIP (Serial Line IP).

FIG. 2 is an explanatory view sketching how an ISP is typically constituted. The ISP's computer network NET151 of this example comprises a server S151 and a router R151. The server S151 is connected to a public telephone network TEL151 via a plurality of modems M151, M152, etc.

Terminals T151, T152, etc., represent those of the individuals wishing to gain access to the Internet. The terminals T151, T152, etc., are connected to the public telephone network TEL151 via modems, not shown. These individuals' terminals are typically personal computers equipped with serial ports.

Where a user wishes to hook up to the Internet via an ISP, it is customary for the user to sign a contract with the ISP in advance. With the appropriate contract signed by both the user and the ISP, an account name and a password are provided to the user.

When any one of the individuals' terminals T151, T152, etc., is attempting to access the Internet, the user at the terminal dials a telephone number of the ISP to call the ISP's computer network NET151. When called up, the server S151 requests the input of an account name and a password to verify that the user in question is indeed under contract with the ISP.

When the entered account name and password are found to be correct attesting to the contract between the user and the ISP, the server S151 searches for an available IP address and assigns that address temporarily to the terminal (T151, T152, etc.). Using the IP address thus furnished, the terminal in question gains access to the Internet.

In the above example, PPP connections were shown to be established using telephone lines. Alternatively, the ISDN (Integrated Service Digital Network) may be utilized. The ISDN64 offers three channels per line: two B channels at 64 kbps and one D channel at 16 kbps. Where an ISDN arrangement is available, IP packets are allowed to flow over a B channel serving as a 64-kbps line. Because there are two B channels, a contract to use one telephone line of the ISDN effectively allows two lines to be used independently.

The Internet is available to anyone basically free of charge. An Internet telephone service using the Internet for making calls costs illustratively charges of the contract with an ISP, local telephone charges up to the ISP and usage fees of the ISDN. This means that long-distance and international calls are placed at significantly low costs if the Internet is utilized. Thanks to the moderate expenses involved, other communication services based on the Internet are also coming into use.

One problem with the Internet-based telephone communication is the inability to call up a user's terminal connected to the Internet on a PPP or like basis. Destinations of data transfers over the Internet are identified by IP addresses. However, users' terminals that gain access to the Internet under the PPP through contract with an ISP are assigned their temporary IP addresses only when they request connection to the network. These terminals have no permanent IP addresses assigned thereto. This means that if the first of two communicating parties usually connected under the PPP via the ISP has not currently established a PPP connection, the second parity attempting to connect to the first party under the PPP over the Internet has no way of knowing the IP address of the first party. It is thus impossible to call up the other party directly.

On the other hand, terminals of LANs run by corporations, universities and other institutions are connected to the Internet not via an ISP but directly. These terminals may call up one another using appropriate IP addresses whenever needed because their IP addresses are permanently assigned and they operate at all times.

Some of these LAN terminals work under the DHCP (Dynamic Host Configuration Protocol). That is, a server on the LAN assigns available IP addresses to only those terminals that are actually connected to the network, whereby the number of IP addresses is economized. Such terminals, even if they are part of a LAN of a corporation or a university, are thus assigned only temporary addresses instead of permanent, unique IP addresses. When someone wants to call any one of these terminals, it is impossible to place the call because the target terminal's IP address, unlike an ordinary telephone number, cannot be known beforehand.

One solution to the problem above is provided by use of the so-called rendezvous server or like service capable of affording the calling party a necessary IP address of the destination party. A party wishing to utilize such a service first turns on his computer and logs onto the server. The calling party then requests a list of currently logged-in parties under the service contract to be sent from the server. Looking at the list, the calling party selects an appropriate party to communicate with and informs the server thereof. In turn, the server furnishes the IP address of the selected party. Using the IP address thus acquired, the calling party then goes into end-to-end (PPP) communication with the desired party.

Making use of such services for communication over the Internet involves the following major disadvantages:

(1) Two parties wishing to communicate with each other must turn on their computers and register with the appropriate server of the service such as the rendezvous server before communication can take place. Once a party is put on the list, removing power from the party's computer does not automatically erase the terminal from the list. In other words, finding a party in the list does not necessarily mean that the party in question has logged in and is ready to communicate.

(2) Server usage charges need to be paid.

(3) Each party's log-in information (i.e., IP address) registered with the server is effectively left open to the public. There is little possibility of keeping one's privacy.

(4) Because the contracted parties' IP addresses are all disclosed in the list, unnecessary calls may arrive unsolicited from terminals other than those one may wish to communicate with.

(5) If the server shuts down, no communication can take place.

The Internet is what is known as an open network that only offers a limited degree of privacy in the communication of data. To secure highly private communication over the Internet generally requires that the terminals concerned exchange beforehand encryption information or data compression information to ensure privacy. Communication is subsequently carried out on the basis of the encryption information or the like thus exchanged.

The above measure for communication privacy is not quite secure because the encryption information transmitted over the Internet can be intercepted by an unscrupulous third party. If the encryption information is decoded, there is no privacy of communication.

To secure privacy of communication, it is generally necessary to use encryption methods or data compression schemes involving sophisticated algorithms that are difficult to decipher. In any case, it is no easy task to acquire a high degree of privacy in communication over the Internet.

SUMMARY OF THE INVENTION

It is therefore an object of the present invention to provide a data communication method for use in a communication setup where address information about a desired party on a network is not previously known to a calling party, the method allowing the two parties to communicate with each other over the network on an end-to-end communication basis without recourse to the rendezvous server or like services.

It is another object of the present invention to provide a data communication method and a data communication terminal whereby a high degree of privacy is ensured in communication using encryption or data compression schemes of simple algorithms.

In carrying out the invention and according to one aspect thereof, there is provided a data communication method for transmitting and receiving data between communication terminals over a computer network, the method comprising the steps of: allowing a first communication terminal to request connection to the computer network via a first telephone line in order to acquire a first address of the first communication terminal; allowing the first communication terminal to transmit information including at least the first address to a second communication terminal via a second telephone line; upon receipt by the second communication terminal of the information including the first address, allowing the second communication terminal to request connection to the computer network via the first telephone line in order to acquire a second address of the second communication terminal; and allowing the second communication terminal to output information including the first and the second addresses onto the computer network to request communication with the first communication terminal; whereby communication is established between the first and the second communication terminals over the computer network.

Other objects, features and advantages of the invention will become more apparent upon a reading of the following description and appended claims.

BRIEF DESCRIPTION OF THE DRAWINGS

FIG. 1 is an explanatory view outlining how the Internet is formed;

FIG. 13 is a flowchart of steps performed by the other communicating terminal under the third embodiment.

DESCRIPTION OF THE PREFERRED EMBODIMENTS

Preferred embodiments of the invention will now be described with reference to the accompanying drawings. The description that follows will center on end-to-end (inter-terminal) communications between individuals over the Internet.

Figure 3:
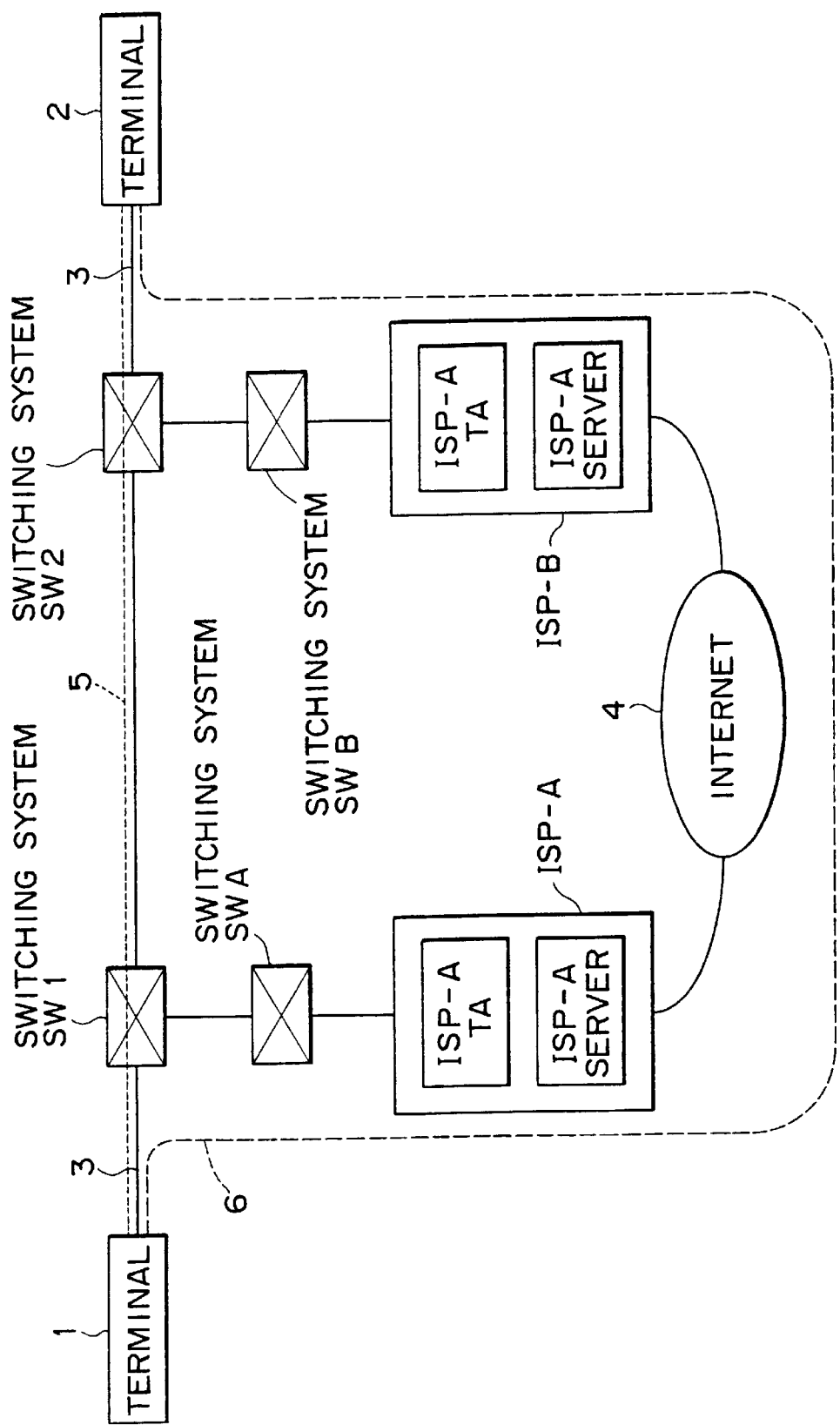
FIG. 3 is a schematic view of a communication network to which a communication method embodying the invention is applied.

FIG. 3 is a schematic view of a communication network to which a communication method embodying the invention is applied. In FIG. 3, communication terminals 1 and 2 are personal computers each carrying an application program permitting telephone calls over the Internet.

In the example of FIG. 3, telephone lines 3 connected to the terminals 1 and 2 are an ISDN line each. As mentioned earlier, one ISDN line has enough line capacity to serve as two lines that may be used independently. Switching systems SW1 and SW2 switch telephone calls for the terminals 1 and 2 respectively.

Figure 2:
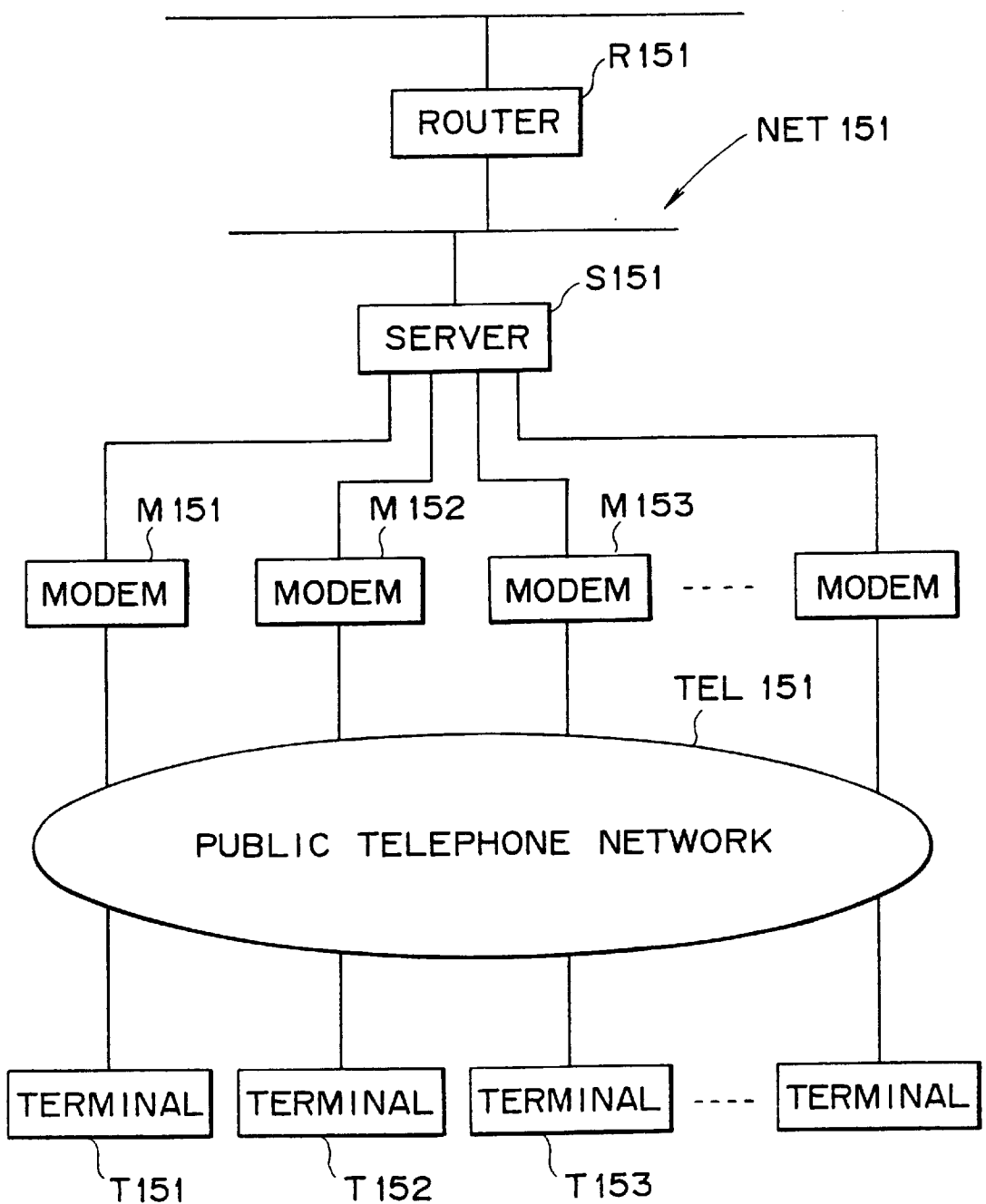
FIG. 2 is an explanatory view sketching how an Internet service provider is typically constituted.

ISP-A and ISP-B denote Internet service providers under contract with users at the terminals 1 and 2 respectively. The ISP-A and ISP-B each comprise a terminal adapter (TA), a server and a router (not shown in FIG. 3) like the one described with reference to FIG. 2.

Switching systems SWA and SWB switch telephone calls for the ISP-A and ISP-B respectively. The ISP-A and ISP-B are connected to the Internet 4.

The switching systems SW1, SW2, SWA and SWB are all switching systems of the so-called ISDN public telephone network. This means that, say, the terminal 1 may place a call using an ordinary telephone number of the terminal 2, ISP-A or ISP-B for communication therewith.

As described above, for the terminal 1 to engage in end-to-end communication with the terminal 2 over the Internet 4 requires that the terminal 1 acquire an IP address of the terminal 2 in advance. Once the IP address of the other party is known, the terminal 1 may send a packet comprising its own IP address and that of the other party through the ISP-A, the Internet 4 and the ISP-B in that order in order to establish end-to-end communication with the terminal 2.

Figure 4:
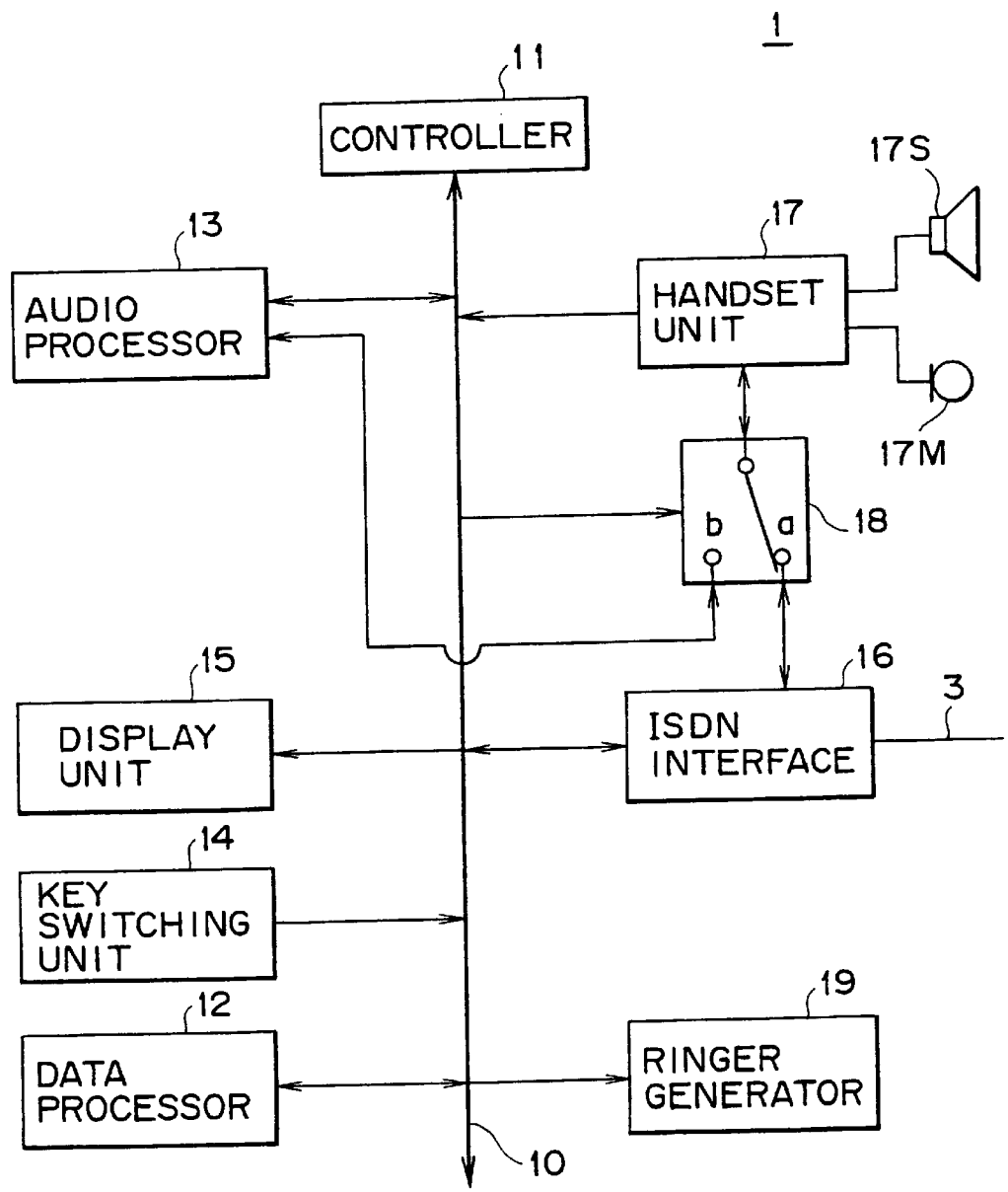
FIG. 4 is a block diagram of a typical constitution of terminals for use with the inventive communication method.

The constitution of the terminals 1 and 2 will now be described. In the setup of FIG. 3, the two terminals have the same structure. FIG. 4 is a block diagram of a typical constitution of the terminals in this example.

As described, the communication terminals of the above example are personal computers. In each terminal, a system bus 10 interconnects a controller 11, a data processor 12, an audio processor 13, a key switching unit 14, a display unit 15, an ISDN interface 16, a handset unit 17, a switching circuit 18, and a ringer generator 19.

The controller 11 controls the terminal as a whole. In conjunction with the data processor 12, the controller 11 also carries out necessary data processing tasks such as protocol verification of data received over the Internet and preparation of data to be transmitted over the Internet.

All audio data are compressed when transmitted as telephone calls over the Internet. In handling such calls, the audio processor 13 compresses audio data to be transmitted, and expands received audio data.

The key switching unit 14 comprises a dial key and other key switches. The controller 11 recognizes which of the keys is operated and carries out the corresponding control operation. The key switching unit 14 of this terminal constitution includes an acknowledge key. The acknowledge key is operated when the incoming call is acknowledged to be an advance transmission of an IP address in preparation for subsequent communication over the Internet. Unlike the usual off-hook action, operating the acknowledge key causes the terminal to transmit a disconnect message and to disconnect the line.

The display unit 15 displays a keyed-in telephone number of a call that is about to be made, a call number included in calling-terminal information received over the ISDN (i.e., the other party's telephone number), and other information necessary for the receiving terminal to accept a call. The information required by the receiving terminal for communication typically includes an IP address and encryption information. In this example, as will be described later, the display unit 15 of the calling terminal also displays a message sent by the other party accepting the solicited communication over the Internet.

The ISDN interface 16 is connected to a line 3. In this example, the line 3 permits "2B+D" communication over three channels (i.e., two B channels and one D channel).

The handset unit 17 converts to an analog audio signal the digital audio data received through the switching circuit 18. The converted analog audio signal is output to a speaker 17S. In addition, an audio signal input through a microphone 17M is converted by the handset unit 17 into digital data for output to the switching circuit 18.

The switching circuit 18 is controlled in its switching action by the controller 11. Specifically, the switching circuit 18 is set to an "a" position for ordinary ISDN telephone calls and to a "b" position for telephone calls over the Internet.

The ringer generator 19 generates a ringer (i.e., ringing tone) when an incoming call is detected. The generated tone informs the user that a call is being received.

The terminal makes an ISDN telephone call as follows: Initially, the switching circuit 18 is set to the "a" position as shown. Digital audio data received by the ISDN interface 16 are fed to the handset unit 17 via the switching circuit 18. The digital audio data are converted to analog audio data before being sent to the speaker 17S. The speaker 17S provides an audio output.

A send audio signal input through the microphone 17M is converted by the handset unit 17 into digital audio data. The digital audio data are sent through the switching circuit 18 and ISDN interface 16 and on to the ISDN line 3.

The terminal places a telephone call over the Internet as follows: The switching circuit 18 is switched to the "b" position, opposite to the illustrated position. Audio data received by the ISDN interface 16 from the ISDN line 3 via the Internet are processed for protocol requirements by the controller 11. The processed data are handed over to the audio processor 13. The audio processor 13 expands the received data and forwards the expanded data to the handset unit 17 through the switching circuit 18. The handset unit 17 converts the received data to analog audio data that are output audibly by the speaker 17S.

A send audio signal input through the microphone 17M is converted by the handset unit 17 into digital audio data. The digital audio data are forwarded through the switching circuit 18 to the audio processor 13 for data compression. The compressed data are handed over to the controller 11. In cooperation with the data processor 12, the controller 11 converts the received audio data into a data train to be transmitted according to the telephone application protocol of the Internet. The converted data train is placed onto the ISDN line 3 through the ISDN interface 16.

(First Embodiment of the Inventive Communication Method)

What follows is a description of how a telephone call is made by a first embodiment of the inventive communication method over the Internet using the terminals 1 and 2 of the above-described constitution.

With the first embodiment, prior to a telephone communication between the terminals 1 and 2 over the Internet, either terminal transmits its own IP address and suitable encryption key information to the other terminal.

Upon receipt of the IP address and the encryption key information, the receiving terminal gains access to the Internet via an ISP and acquires its own IP address. The receiving terminal then makes a call comprising the IP address thus acquired and the other party's IP address received earlier in accordance with the appropriate protocol of the Internet. This causes the two terminals to be connected for communication via the Internet. Data to be exchanged between the two terminals are encrypted by use of an encryption algorithm that may be decoded using the received encryption key.

The first embodiment of the communication method according to the invention will now be described in more detail. In the description that follows, the terminal that transmits its IP address to the other party over the ISDN line prior to a telephone communication therebetween over the Internet will be referred to as the calling terminal, and the terminal that receives the transmitted IP address will be called the receiving terminal.

With the first embodiment in use, prior to a telephone communication illustratively between the terminals 1 and 2 over the Internet, either terminal acquires its own IP address by connecting to the Internet via the ISP. Using a line different from the line connected to the ISP, the calling terminal places to the other terminal an ISDN telephone call comprising the IP address and suitable encryption key information.

Figure 5:
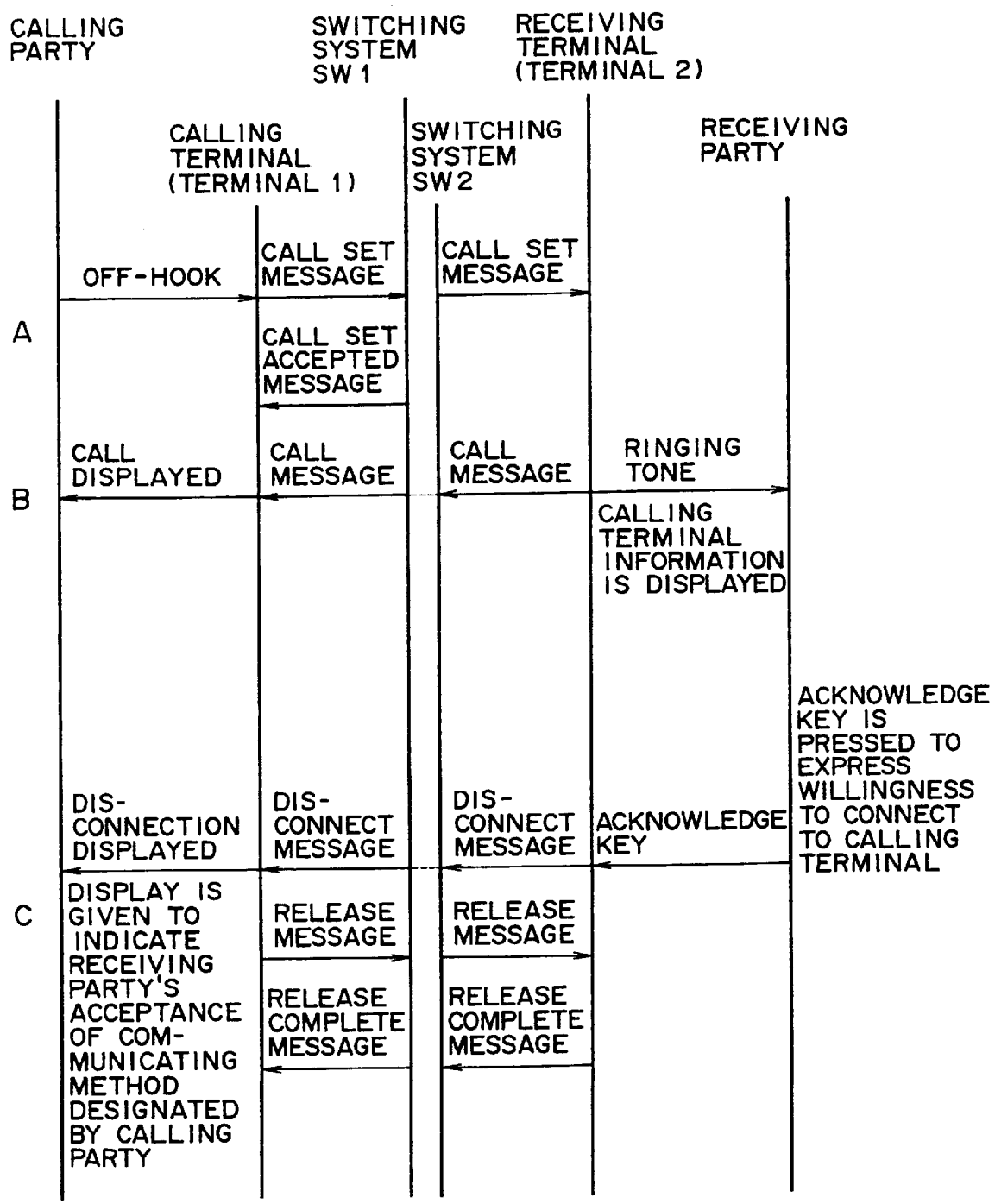
FIG. 5 is a schematic view showing typical sequencing of a preliminary communication prior to communications over a network according to the inventive communication method.
Figure 6:
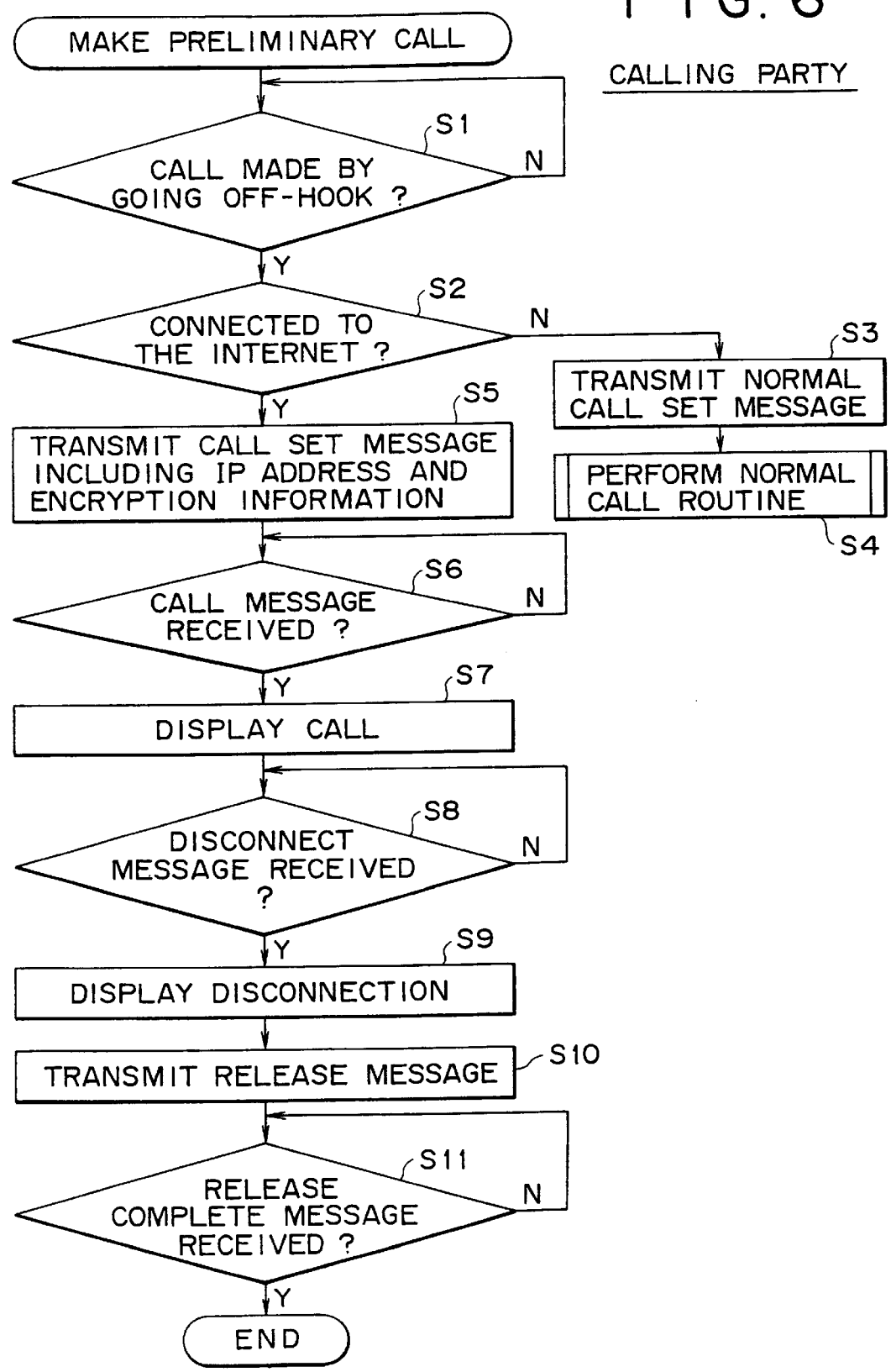
FIG. 6 is a flowchart of steps performed by a calling terminal in the sequencing of FIG. 5.
Figure 7:
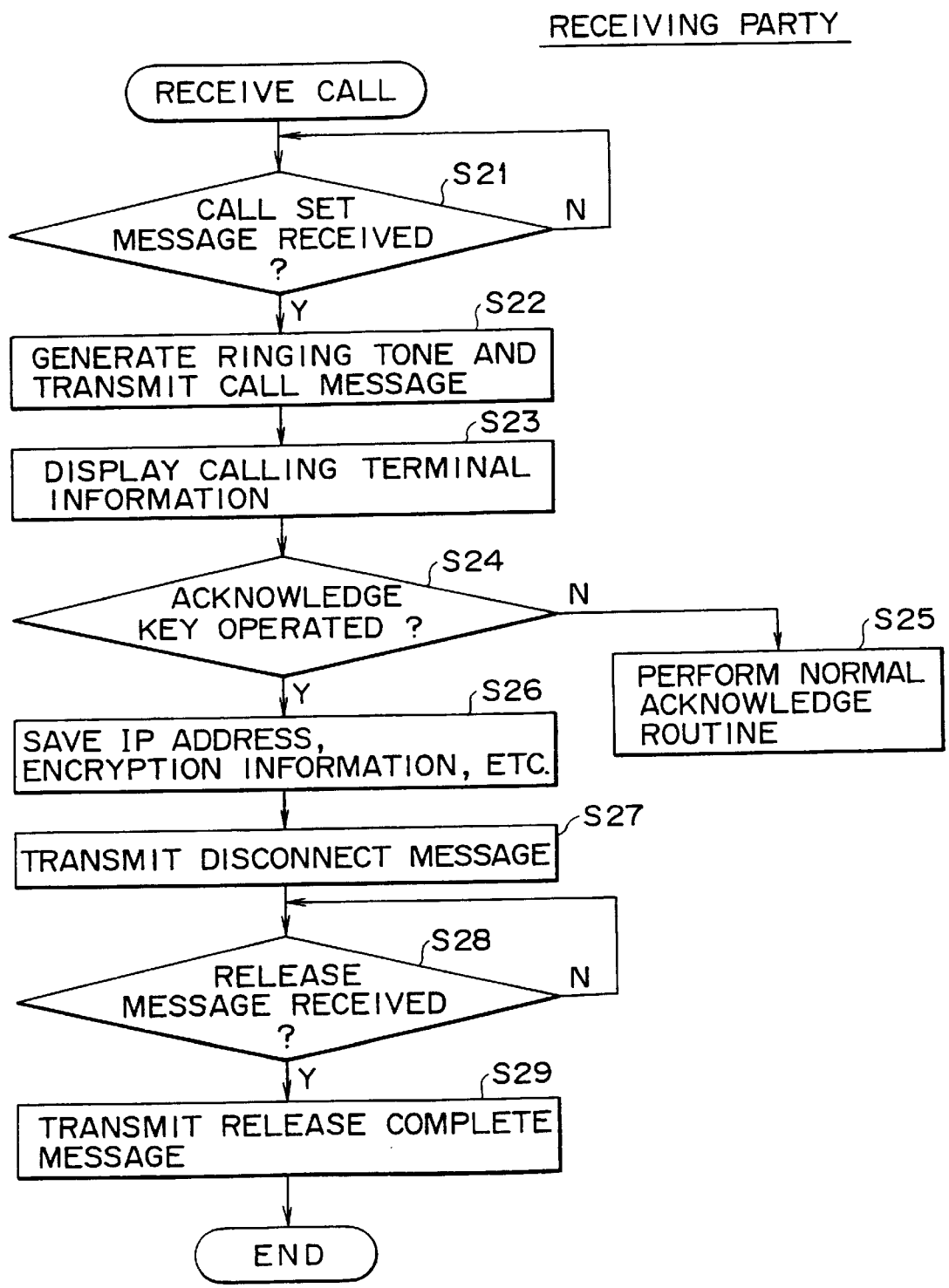
FIG. 7 is a flowchart of steps carried out by a receiving terminal in the sequencing of FIG. 5.

FIG. 5 is a schematic view showing typical sequencing of the first embodiment making an ISDN telephone call for transmitting an IP address prior to a telephone communication over the Internet. FIG. 6 is a flowchart of steps performed by the calling terminal in the sequencing of FIG. 5, and FIG. 7 is a flowchart of steps carried out by the receiving terminal in the same sequencing. It is assumed here that the calling and receiving terminals are the terminals 1 and 2, respectively.

The sequencing of the ISDN telephone communication by the first embodiment prior to a telephone call over the Internet will now be described with reference to FIGS. 5 through 7.

The ISDN telephone communication, as indicated by broken line 5 in FIG. 3, takes place over a route spanning the terminal 1, switching system SW1, switching system SW2 and terminal 2. The telephone call over the Internet, as shown by broken line 6 in FIG. 3, is made over a route spanning the terminal 1, switching system SW1, switching system SWA, ISP-A, the Internet 4, ISP-B, switching system SWB, switching system SW2, and terminal 2.

Prior to the sequencing, the terminal 1 (i.e., calling terminal) gains access to the ISP-A and from there to the Internet using an ISDN line. The terminal 1 acquires an IP address and stores it in its buffer. With the terminal 1 connected to the Internet, an operator of the terminal 1 (i.e., calling party) utilizes another ISDN line to transmit the IP address to the terminal 2.

As shown in a sequence A of FIG. 5, the operator of the terminal 1 (calling party) goes off-hook, inputs the telephone number of the terminal 2, and makes a call. The call is recognized in step S1 of FIG. 6, and step S2 is reached. In step S2, a check is made to see if the terminal 1 is currently connected to the Internet. If the terminal 1 is not connected to the Internet, step S3 is reached in which a call set message including the calling party's telephone number is output like an ordinary ISDN telephone call. Step S3 is followed by step S4 in which a normal telephone call handling routine is executed.

If the terminal 1 is found to be connected to the Internet in step S2, step S5 is reached. In step S5, the terminal 1 transmits a call set message including its own IP address acquired and the suitable encryption key information. The IP address and encryption key information are transmitted as user-to-user information contained in the call set message.

The user-to-user information is up to about 128 bytes in size. With the first embodiment, the information to be sent comprises the calling party's name in addition to the IP address and encryption key information. As information for determining a method for processing data, it is also possible to supplement the encryption key by application encoding schemes such as an audio data compression encoding method or encryption algorithms. If the receiving terminal carries application software, the information for designating a suitable application to be used may be transmitted to that terminal.

When the call set message is output from the terminal 1, the message is sent to the terminal 2 (receiving terminal) via the switching systems SW1 and SW2 as shown in the sequence A of FIG. 5. From the switching system SW1, a call set accepted message is transmitted to the calling terminal 1. The receiving terminal 2 detects reception of the call set message in step S21 of FIG. 7, and goes to step S22. In step S22, a ringing tone is generated notifying the user at the receiving terminal that a call is being received. At the same time, a call message is transmitted indicating generation of the ringing tone (sequence B in FIG. 5).

The receiving terminal 2 then proceeds to step S23. In step S23, the receiving terminal 2 displays calling terminal information on its display unit 15. The display unit 15 displays the calling party's telephone number and, if the call set message contains the IP address, encryption key and calling party's name, also displays such additional information. If the call set message includes an application, an indication is provided to show that the application has been sent. The indications on the display unit 15 allow the user to know whether the incoming call is an ordinary telephone call or a preliminary call designating an IP address and a data processing method in preparation for a subsequent communication over the Internet.

The call message output by the receiving terminal 2 is transmitted to the calling terminal 1 through the switching systems SW2 and SW1, as shown in a sequence B of FIG. 5. The calling terminal 1 receives the call message in step S6. Step S6 is followed by step S7 in which the display unit 15 of the calling terminal 1 indicates that a ringing tone is being generated by the receiving terminal 2.

The receiving party checks the indications on the display unit 15 of the terminal 2, and decides whether or not to acknowledge the call. In step S24, the receiving terminal 2 checks to see if the receiving party has taken an acknowledging action (i.e., whether the acknowledge key is operated). If no acknowledging action is taken, step S25 is reached in which a normal acknowledging routine is executed.

If the receiving party's operation of the acknowledge key is detected in step S24, step S26 is reached. In step S26, the IP address, encryption key, and application information included in the call set message are saved into memory. In step S27, a disconnect message is output.

The disconnect message is transmitted to the calling terminal 1 through the switching systems SW2 and SW1, as shown in a sequence C of FIG. 5. In step S8 of FIG. 6, the calling terminal 1 detects the disconnect message. In step S9, a disconnection display is given on the display unit 15 of the calling terminal 1. The display unit 15 also indicates that the receiving party has accepted the communication over the Internet solicited by the calling party.

Going to step S10, the calling terminal 1 outputs a release message. The release message is transmitted to the receiving terminal 2 through the switching systems SW1 and SW2. The receiving terminal 2 detects the release message in step S28. After detecting the release message, the terminal 2 reaches step S29 in which a release complete message is output, and the current routine is brought to an end. When the release complete message is detected by the calling terminal 1 in step Sl, the calling routine is terminated.

In the manner described, the IP address of the terminal 1 being connected to the Internet over one line is transmitted to the terminal 2 over another line. On receiving the IP address, the terminal 2 gains access to the Internet, acquires its own IP address, performs a process for connection to the other party using the received IP address, and issues an end-to-end communication request designating the terminal 1. These settings allow a communication to take place between the terminals 1 and 2 over the Internet.

In the state above, the calling terminal 1 and the receiving terminal 2 have already specified and recognized the data encryption method (i.e., data processing method) therebetween based on the encryption key information. Using the designated encryption method, the two terminals encrypt data to be exchanged. If an application such as an encryption algorithm or a compression encoding method, or suitable information for designating such a method was sent earlier to the receiving terminal, the data to be communicated are processed by the received or designated application for transmission.

At this point, the IP address and other necessary information are used after retrieval from the memory of the terminal 2. It is also possible to operate here a specific key on the receiving terminal 2 in order to let the suitable application issue an end-to-end communication request designating the terminal 1.

Figure 8:
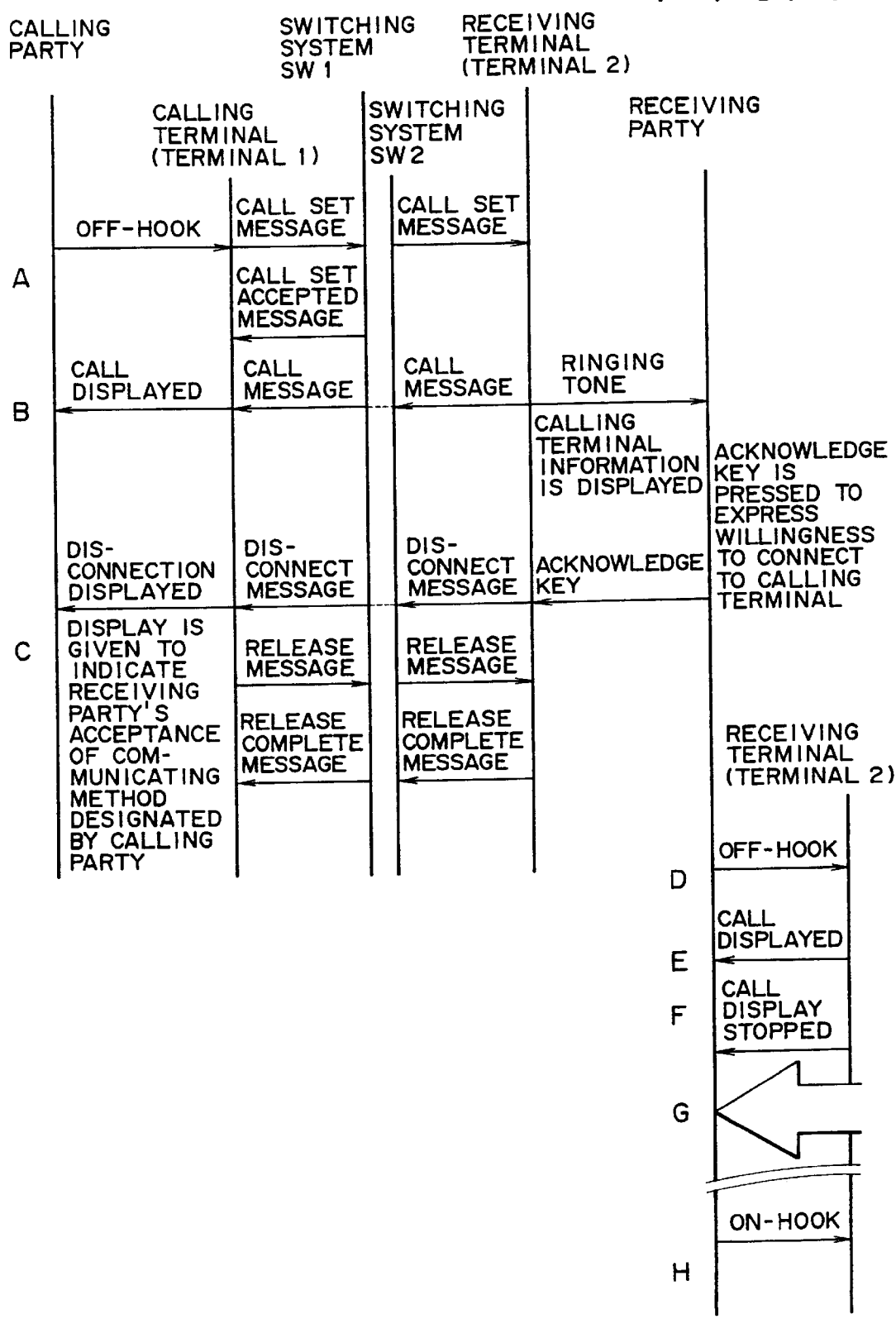
FIG. 8 is a schematic view depicting overall sequencing of a first embodiment of the inventive communication method.
Figure 9:
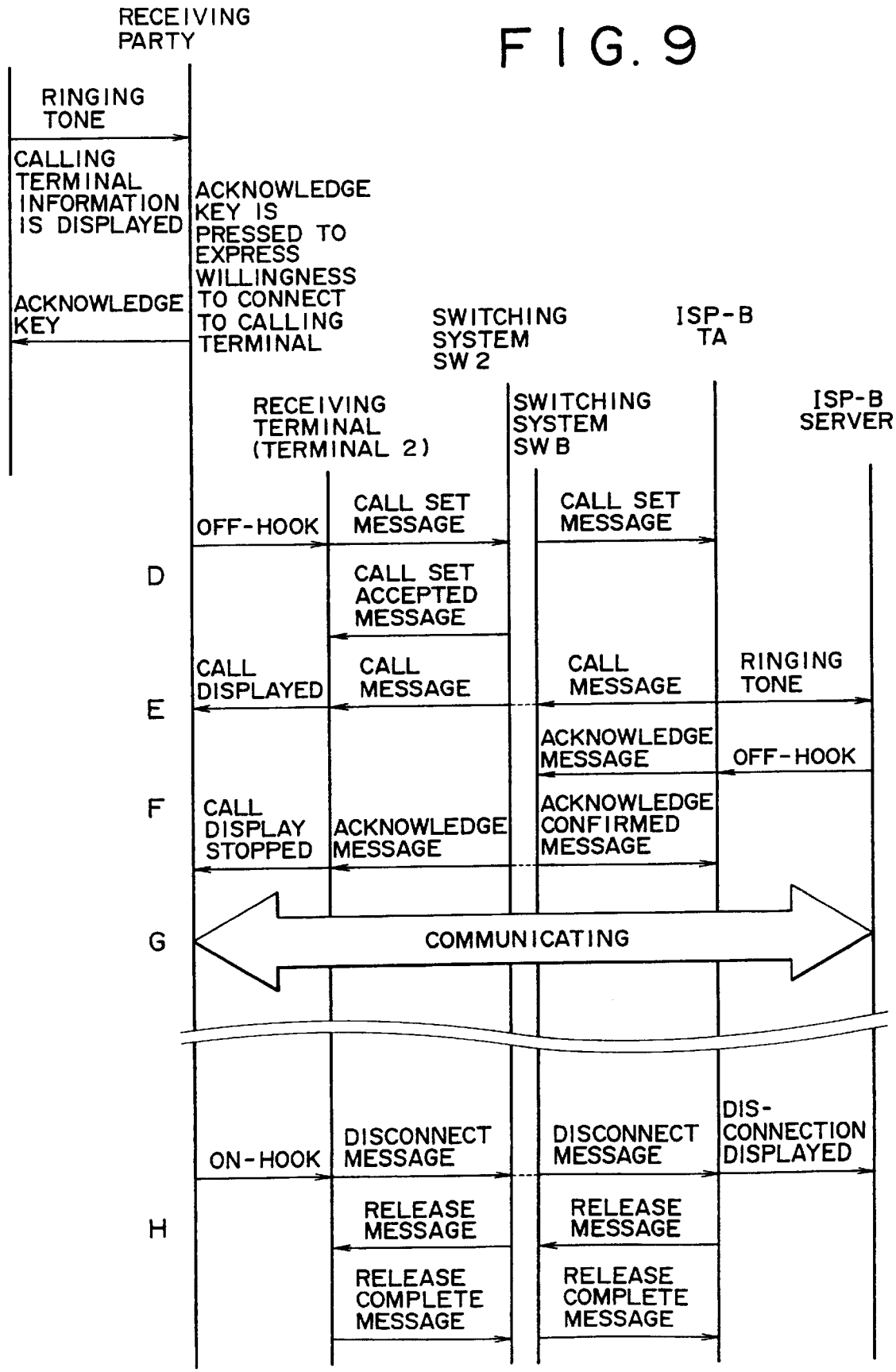
FIG. 9 is a schematic view illustrating typical sequencing of the first embodiment for communication over a network.

The sequences A, B and C in FIG. 5 are followed by sequences D through H carried out as depicted in FIGS. 8 and 9 when communication takes place between the terminals 1 and 2 over the Internet. The sequences D through H will now be described with reference to FIG. 9. It should be noted that the sequences D through F and H in FIG. 9 are intended to let a given terminal make a call to an ISP. As such, these routines are the same as those of a usual ISDN calling and receiving routine.

Having obtained an IP address, the operator at the receiving terminal 2 (i.e., receiving party) calls up and connects to the ISP-B under contract with the terminal 2 over an ISDN line for gaining access to the Internet 4. As shown in the sequence D of FIG. 9, the terminal 2 goes off-hook and calls up the ISP-B that works as a receiving terminal from the viewpoint of the terminal 2. The terminal 2 then transmits a call set message to the ISP-B through the switching systems SW2 and SWB. Upon receipt of the call set message, the ISP-B generates a ringing tone and outputs a call message as indicated in the sequence E of FIG. 9. Given the call message, the terminal 2 gives a call display.

When the ISP-B goes off-hook in response to the ringing tone, an acknowledge message is transmitted from the ISP-B to the terminal 2 through the switching systems SWB and SW2 in the sequence F of FIG. 9. The terminal 2 stops its call display. At this point, the switching system SWB sends an acknowledge confirmed message to the ISP-B. These operations bring about a state in which the terminal 2 may connect to the Internet via the ISP-B.

In the sequence G of FIG. 9, an information channel is used to confirm the connection with the ISP (in exactly the conventional manner). Once the connection to the Internet is established, the terminal 2 issues a connection request using the IP address received from the terminal 1. A telephone communication then takes place between the terminals 1 and 2 over the Internet.

Figure 10:
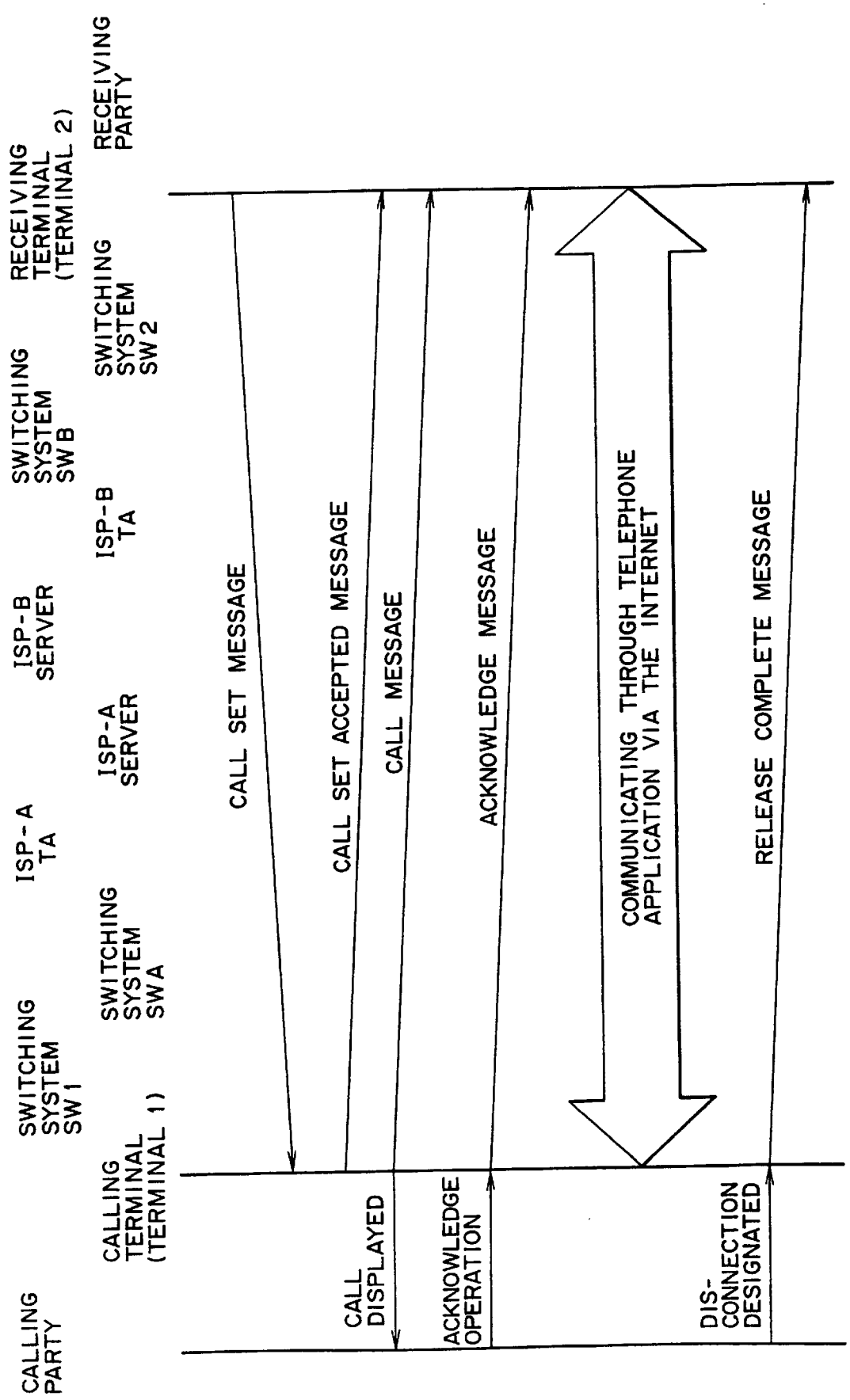
FIG. 10 is a schematic view showing typical sequencing of a telephone call over the Internet.

FIG. 10 is a schematic view showing typical sequencing for connection needed to carry out communications over the Internet. The sequencing of FIG. 10 is intended to permit private communication of target data as an application of a telephone call between the terminals 1 and 2 over the Internet. When either of the two communicating terminals signals a disconnect message, the communication line is released as depicted in FIG. 10, and the communication is terminated. Then the terminal 2 ends the connection to the ISP-B by carrying out the sequence H in FIG. 9.

As described, the terminal 1 connected to the Internet first transmits its IP address to the terminal 2 using a separate line. The terminal 2, having received the IP address, gains access to the Internet and communicates with the terminal 1 via the Internet as an application of a telephone call. This is a direct communication carried out between the terminals 1 and 2 over the Internet without recourse to such services as the rendezvous server.

Prior to the communication over the Internet, the calling terminal 1 transmits to the receiving terminal 2 the appropriate information (e.g., encryption key, application) for determining a method for processing data so as to secure privacy in communication. Subsequently transmitted data are encrypted or compressed to ensure privacy by use of the encryption method or audio data compression encoding method designated by the encryption key or like information.

Furthermore, the encryption key information and application information to determine the data processing method for communication privacy may be transmitted beforehand along with the IP address every time an Internet-based communication is to take place. It is thus easy to change the encryption key or application information in carrying out each communication over the Internet. This means that an encryption method or compression encoding method of simple algorithms still ensures a high degree of privacy in communication.

The first embodiment above was shown deciding whether or not to transmit an IP address and related information included in a call set message depending on whether or not the calling terminal is currently connected to the Internet. Alternatively, the key switching unit 14 may comprise a key switch specifying that an IP address, an encryption key, etc., be included in a call set message when a call is to be made. In such a setup, operating the key switch alone will permit placing a call with the IP address, encryption key and other relevant information contained in the call set message.

In the description above, the receiving user was shown executing communication over the Internet using a terminal that has acquired an IP address and an encryption key. Alternatively, since the IP address and encryption key are displayed on the display unit 15, the receiving user who has recorded or memorized the displayed information may operate using that information a communication terminal different from the terminal 2 in order to conduct communication via the Internet.

(Second Embodiment of the Inventive Communication Method)

How a second embodiment of the inventive communication method works will now be described. With the second embodiment in use, the operators at the terminals 1 and 2 first agree by telephone call to communicate subsequently over the Internet. One of the terminals then gains access to the Internet and transmits the acquired IP address and other information such as an encryption key and an application to the other terminal illustratively over an ISDN. The terminal that received the transmitted IP address also connects to the Internet in the same manner as with the first embodiment. Thereafter, communication with a high degree of privacy takes place between the two terminals over the Internet as shown in FIG. 10.

With the first embodiment, the terminal 1 accesses the Internet before transmitting an IP address to the terminal 2 through an ISDN telephone communication. With the second embodiment, by contrast, there is no need for any of the two terminals to be connected beforehand to the Internet.

Figure 11:
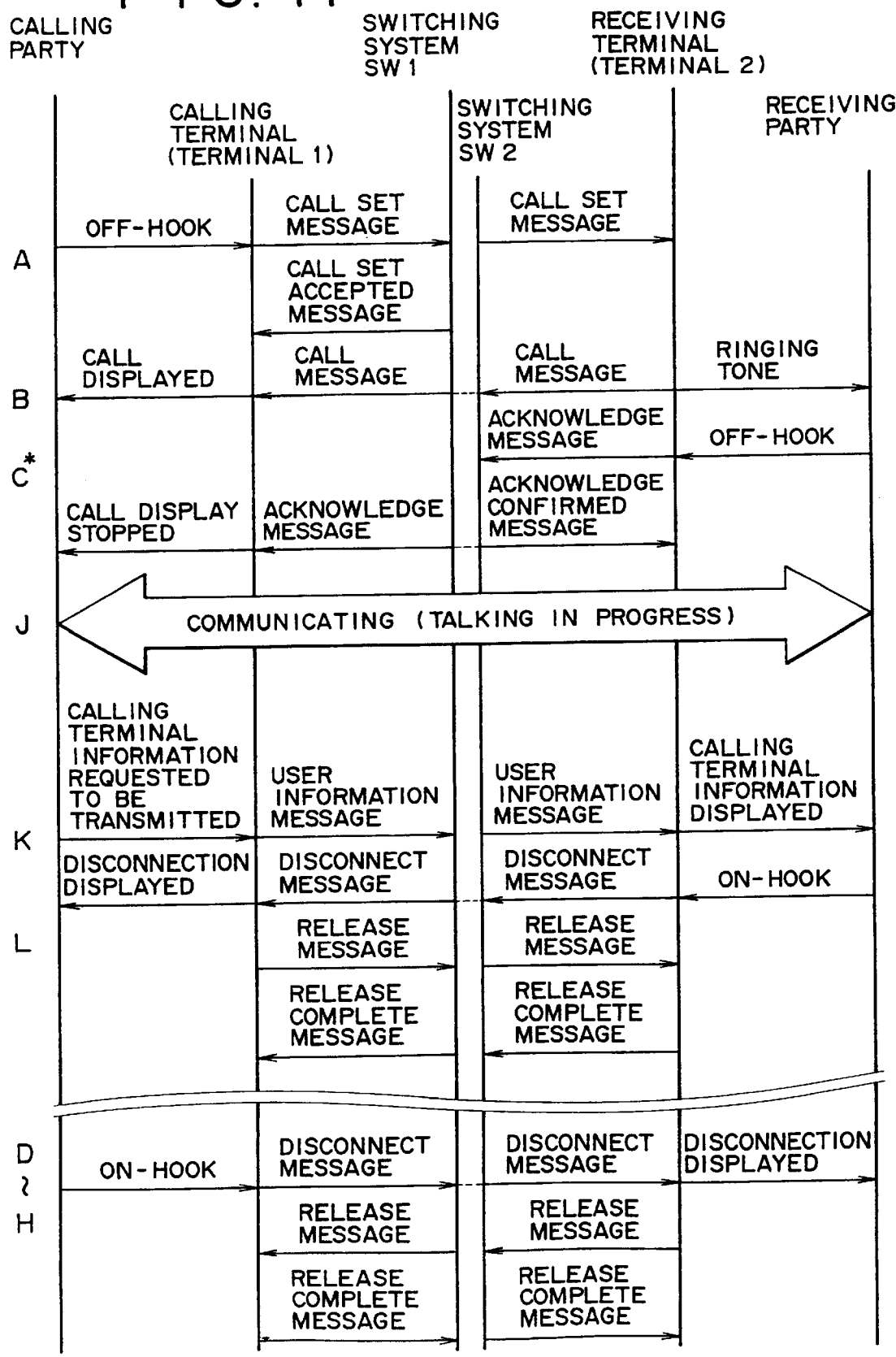
FIG. 11 is a schematic view sketching overall sequencing of a second embodiment of the inventive communication method.

FIG. 11 is a schematic view showing typical sequencing of the second embodiment. In FIG. 11, sequences A through C are the same as the above-described sequences A through C that are in effect until the receiving party acknowledges a normal ISDN telephone call.

The sequences A and B in FIG. 11 are identical to the sequences A and B in FIG. 5, except that the terminal 1 need not be connected to the Internet. The call set message does not include an IP address or other information such as an application.

With the second embodiment in use, the terminal 2 goes off-hook to acknowledge a call in response to a ringing tone, as shown in a sequence C* of FIG. 11. The receiving terminal 2 transmits an acknowledge message to the switching system SW2, and the switching system SW2 returns an acknowledge confirmed message to the terminal 2. At this point, an acknowledge message is sent from the switching system SW1 to the calling terminal 1, causing the terminal 1 to stop its call display. The process connects the terminals 1 and 2 through the route indicated by broken line 5 in FIG. 3. This is a telephone call (busy) state (sequence J in FIG. 11) brought about between the two terminals over the ISDN.

During the telephone call, the second embodiment allows the calling and receiving parties to confirm their intention to communicate subsequently over the Internet. Illustratively, the two parties may agree that the terminal 1 will send an IP address, an encryption key and application information to the terminal 2 and that the terminal 2 will issue a connection request for communication over the Internet. Under such an agreement, the terminal 1 first connects to the Internet over a different line and acquires its own IP address.

The operator at the terminal 1 issues a transmission request telling the terminal 1 to transmit the acquired IP address, encryption key and application information to the terminal 2 over the currently occupied line. The transmission request may be issued illustratively by the operator operating a calling terminal information transmission request key, one of the keys on the key switching unit 14 of the terminal 1 shown in FIG. 4.

On detecting the operation of the calling terminal information transmission request key, the terminal 1 transmits to the terminal 2 a set of calling terminal information composed of the acquired IP address, calling party's name, encryption key, application information, and other relevant information if any. The calling terminal information is sent as a user information message by software stored previously in the controller 11. The user information message is transmitted in the format of the above-mentioned user-to-user information (sequence K in FIG. 11).

On receiving the user information message, the receiving terminal 2 causes its display unit 15 to display the received information about the calling terminal, i.e., the IP address, calling party's name and application information. The received information is saved in memory. The receiving party views the displayed information to confirm the IP address, encryption information and other relevant information, and goes on-hook to disconnect the line. This transmits a disconnect message to the terminal 1 through the switching systems SW2 and SW1 in a sequence L of FIG. 11. A disconnection display appears on the display unit 15 of the terminal 1. The terminal 1 returns a release message to the terminal 2 via the switching systems SW1 and SW2. In response, the terminal 2 transmits a release complete message to the terminal 1 through the switching systems SW2 and SW1, whereby the currently occupied line is released.

Thereafter, the terminal 2 that received the IP address, encryption key and other information initiates a highly secured communication with the terminal 1 in the same sequences as the sequences D through H in FIG. 9 for the first embodiment.

(Third Embodiment of the Inventive Communication Method)

The embodiments above were shown applicable to communications between terminals of personal computers. The invention also applies to a remote control communication system practiced as a third embodiment.

The remote control communication system may be implemented illustratively as a remote supervisory system. The remote supervisory system is typically made up of a monitoring center acting as a remote control center and of monitoring equipment terminals that are remotely controlled terminals each equipped with a surveillance camera and sensors. The monitoring center issues communication requests to any monitoring equipment terminal so that the latter will supply video information (picked up by camera) and sensor-output information to the center. In the third embodiment, the monitoring center and the monitoring equipment terminals are assumed to be connected to an ISDN line each.

Figure 12:
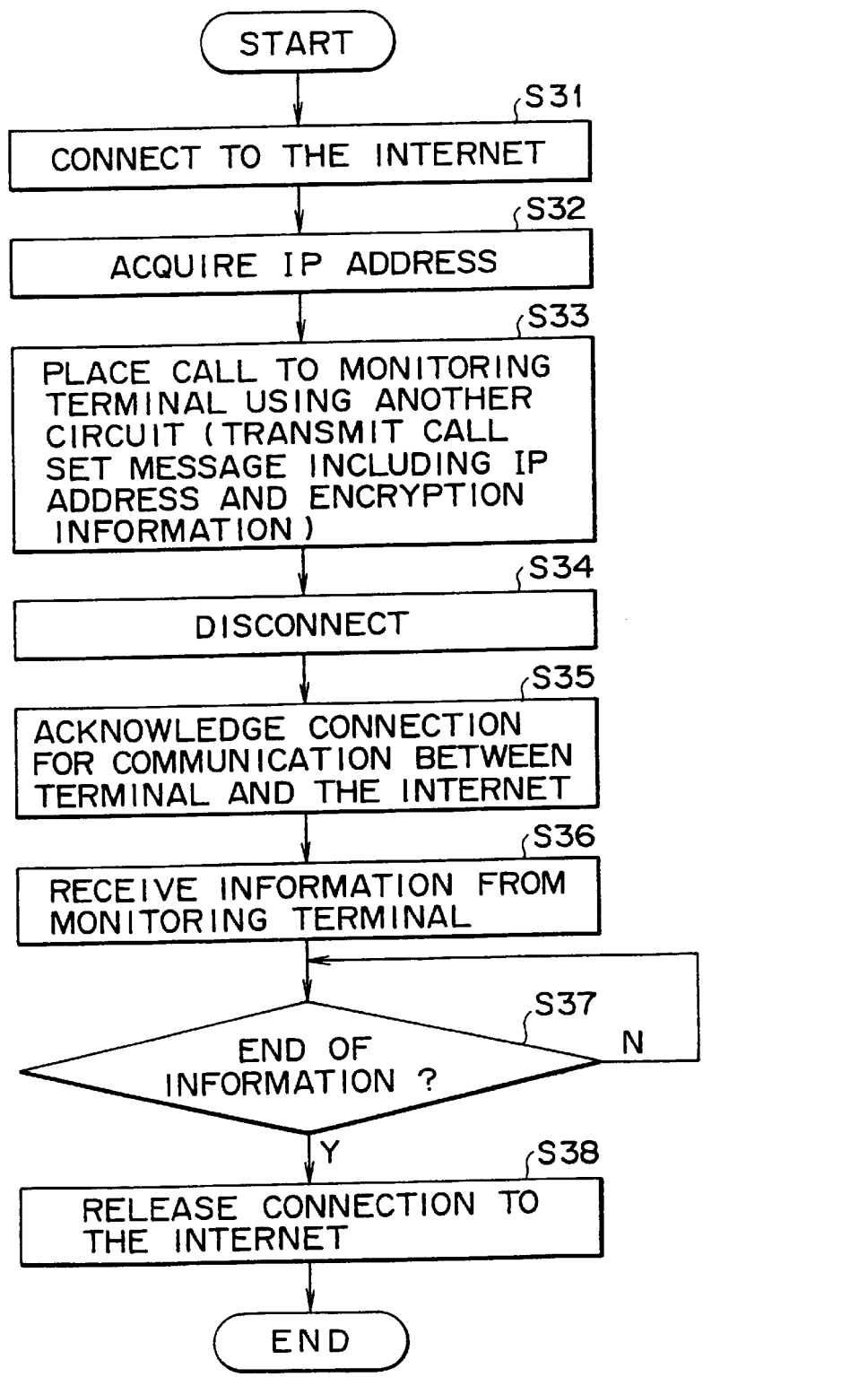
FIG. 12 is a flowchart of steps carried out by one of two communicating terminals under a third embodiment of the inventive communication method.

FIG. 12 is a flowchart of steps performed by the monitoring center of this remote supervisory system. FIG. 13 is a flowchart of steps conducted by a monitoring equipment terminal in the system.

In step S31, the monitoring center gains access to the Internet using an ISDN line. In step S32, the monitoring center acquires its own IP address. In step S33, the monitoring center makes a telephone call over another ISDN line to a desired monitoring equipment terminal. Making the call involves sending calling terminal information comprising the IP address, encryption information and application information. The calling terminal information is included in user-to-user information within a call set message that is transmitted.

The monitoring equipment terminal detects the call set message transmitted from the monitoring center in step S41. On detecting the message, the terminal reaches step S42 in which a ringing tone is generated and a call message is output. In step S43, the terminal analyzes and confirms the calling terminal information contained in the call set message. In step S44, a check is made to see if the received calling party's number (calling number) matches the monitoring center's number registered with the monitoring equipment terminal. If the incoming call is found to have arrived from somewhere other than the monitoring center, step S45 is reached in which no acknowledgement is given. If the check in step S44 has revealed that the call is indeed coming from the monitoring center, step S46 is reached in which acknowledgement is automatically given. Matching the incoming call's number with the registered number determines the caller's identify, which provides security for automatic acknowledgement.

In step S47 following the automatic acknowledgement, the monitoring equipment terminal saves the IP address, encryption key and application information. In step S48, the terminal outputs a disconnect message in the same manner as in the sequence C of FIG. 5.

The monitoring center receives the disconnect message in step S34. As in the example of FIG. 5, the monitoring center outputs a release message and waits for a release complete message to arrive from the monitoring equipment terminal in question. Given the release complete message, the monitoring center releases the line that was connected to the terminal. On receiving the release message from the monitoring center, the terminal outputs the release complete message and releases the currently occupied line.

In step S49, the monitoring equipment terminal gains access to the Internet. In step S50, the terminal issues a request for telephone communication with the monitoring center over the Internet using the acquired IP address of the center. In step S51, the terminal transmits relevant video information and sensor information to the monitoring center over the Internet using the designated encryption or compression encoding application. When the end of transmission is confirmed in step S52, the terminal reaches step S53 in which the line connected to the Internet is released.

In step S35, meanwhile, the monitoring center acknowledges the connection request from the monitoring equipment terminal over the Internet. In step S36, the monitoring center receives and decodes the information transmitted from the terminal. When the end of reception is detected in step S37, the monitoring center goes to step S38 in which the line connected to the Internet is released.

In the manner described, the third embodiment serves as a remote control communication system offering a high degree of privacy. Because information is transmitted over the Internet in a highly secured fashion, the communication may take place at low costs even if there exist relatively long distances between the monitoring center and the monitoring equipment terminals and if the quantities of information to be transmitted are massive. With such reductions in communication costs, remote control services utilizing the above type of remote control communication system are expected to expand in scale. In addition, because information is transmitted over the Internet in a highly secured manner, few problems arise regarding protection of privacy in communication.

In the example of FIG. 13, the security of automatic acknowledgement is provided by verification of the calling number. Alternatively, communication security may be provided when calling-related information such as a call set message from the monitoring center is set to include a predetermined password. In this case, a monitoring equipment terminal will respond automatically only if the password is detected from the received information.

Although the connection to the Internet is released at the end of information transmission in the example of FIG. 13, this is not limitative of the invention. Alternatively, the connection may continue until and unless an Internet connection release operation is carried out by the monitoring center.

(Other Variations)

The embodiments described above have dealt with cases where the IP address is not previously known and needs to be obtained by the receiving terminal which in turn initiates data communication over the Internet. Alternatively, if an IP address is permanently assigned to each of the terminals connected on a LAN at corporations, universities or like institutions, any one of such terminals may first transmit an encryption key and application information to a target terminal and then initiate data communication with the receiving terminal over the Internet.

The information on encryption keys and compression encoding need not be transmitted prior to communications over the Internet. That is, the calling parity that transmitted encrypted or compressed data to another party over the Internet may later furnish the latter via the ISDN, a different network, with an encryption key or application information for decrypting or expanding the received data.

The embodiments above have dealt with examples wherein both the Internet and the ISDN are utilized for communication. However, the invention is not limited by the type of communication line. Analog telephone lines, radio communication circuits, a CATV (cable television) network or any other suitable lines may be utilized as long as they allow any one terminal to be connected to a plurality of parties. It should be noted that the first and the second embodiments above offer different benefits. The first embodiment, which processes data to be communicated, costs less but has a relatively low level of privacy; the second embodiment, by transmitting information for determining a data processing method, is more appreciated where the level of privacy in communication should be high.

Although telephone calls over the Internet have been cited as examples of the communication application, the invention is not limited by the type of application or by the kind of communication network in use.

The constitution of terminals is not limited to an integral type such as the one shown in FIG. 4. Alternatively, the communication interface of the terminal may be furnished outside in the form of an externally attached modem.

The way of transmitting such information as the IP address, encryption key and application information is not limited to putting the information in a call set message or sending the information as a user-to-user information message. Alternatively, the dial tone may be used to transmit the information, or relevant data may be sent by means of a modem where an analog telephone line is in use. The information may also be transmitted by use of sub-address information over the ISDN line. As another alternative, applications, calling parties' names and other pertinent information may be stored in advance corresponding to the calling parties' numbers. When a calling party's number is given, the corresponding information may be retrieved from memory and used as transmission-related information.

As described, in a communication setup where address information about a desired party on the network is not previously known to a calling party, the inventive communication method allows the two parties to communicate directly with each other over the network. Such end-to-end communication is carried out with a high degree of privacy and without recourse to the rendezvous server or like services.

As many apparently different embodiments of this invention may be made without departing from the spirit and scope thereof, it is to be understood that the invention is not limited to the specific embodiments thereof except as defined in the appended claims.

What is claimed is:

1. A data communication method for transmitting and receiving communicated data between communication terminals over a computer network, the method comprising the steps of:
   requesting connection from a first communication terminal to said computer network via a first telephone line in order to acquire a first computer network address of said first communication terminal;
   transmitting from said communication terminal communication information including at least said first computer network address to a second communication terminal via a second telephone line;
   upon receipt by said second communication terminal of the communication information including said first computer network address, requesting connection from said second communication terminal to said computer network via said first telephone line in order to acquire a second computer network address of said second communication terminal;
   outputting from said second communication terminal connection information including said first and said second addresses onto said computer network to request communication with said first communication terminal;
   whereby communication is established between said first and said second communication terminals over said computer network; and
   wherein the communication information transmitted by said first communication terminal to said second communication terminal via said second telephone line further includes encryption key information and said first and said second communication terminals encrypt transmission data using the encryption key for communication therebetween.

2. A data communication method according to claim 1, wherein the communication information transmitted by said first communication terminal to said second communication terminal via said second telephone line further includes calling terminal information, and said second communication terminal, in accordance with said calling terminal information, automatically requests connection to said computer network via said first telephone line.

3. A data communication method according to claim 1, wherein a single Integrated Service Digital Network line comprises said first and said second telephone lines.

4. A data communication method according to claim 3, wherein the communication information transmitted by said first communication terminal to said second communication terminal via said second telephone line is sent as user-to-user information included in a call set message of the Integrated Service Digital Network.

5. A data communication method according to claim 3, wherein the communication information transmitted by said first communication terminal to said second communication terminal via said second telephone line is sent by use of sub-address information of the Integrated Service Digital Network.

6. A data communication method according to claim 1, wherein the communication information transmitted by said first communication terminal to said second communication terminal via said second telephone line is sent as modulated data processed by use of a modem.

7. A data communication method according to claim 1, wherein the communication information transmitted by said first communication terminal to said second communication terminal via said second telephone line is sent by use of a dial tone.

8. A data communication method according to claim 1, wherein the communicated data communicated between said first and said second communication terminals are audio data.

9. A data communication method according to claim 1, wherein said computer network is the Internet.

10. A data communication terminal for use in a data communication system for transmitting and receiving communicated data between communication terminals over a computer network, said data communication terminal comprising:
    address acquiring means for requesting connection to said computer network via a first telephone line in order to acquire a computer network address to identify said data communication terminal on said computer network;
    transmitting means for transmitting communication information including at least said computer network address to another communication terminal via a second telephone line;
    communication controlling means fore acknowledging a connection request sent by said another communication terminal over said first telephone line in order to establish communication between said data communication terminal and said another communication terminal; and
    further comprising encrypting means for encrypting transmission data by a predetermined encryption method, wherein the communication information transmitted by said transmitting means to said another communication terminal includes an encryption key for designating said encryption method.

11. A data communication terminal according to claim 10, wherein the communication information transmitted by said transmitting means to said another communication terminal includes identification information for identifying said data communication terminal.

12. A data communication terminal according to claim 10, wherein a single Integrated Service Digital Network line comprises said first and said second telephone lines.

13. A data communication terminal according claim 12, wherein said transmitting means transmits said communication information as user-to-user information placed in a call set message of the Integrated Service Digital Network.

14. A data communication terminal according claim 12, wherein said transmitting means transmits said communication information as sub-address information of the Integrated Service Digital Network.

15. A data communication terminal according claim 10, wherein said transmitting means processes said communication information using a modem.

16. A data communication terminal according claim 10, wherein said transmitting means transmits said communication information using a dial tone.

17. A data communication terminal according claim 10, wherein the communication data transmitted and received between terminals are audio data.

18. A data communication terminal according to claim 10, wherein said computer network is the Internet.

19. A data communication system for transmitting and receiving communicated data between a first communication terminal and a second communication terminal over a computer network, said first communication terminal comprising:

means for requesting connection to said computer network via a first telephone line in order to acquire a first computer network address of said first communication terminal;

means for transmitting communication information including at least said first computer network address to said second communication terminal via a second telephone line; and said second communication terminal comprising:

means for connecting to said computer network, upon receipt of the communication information including said first computer network address by said second communication terminal, via said first telephone line in order to acquire a second computer network address of said second communication terminal;

means for outputting connection information including said first and said second computer network address onto said computer network to request communication with said first communication terminal;

whereby communication is established between said first and said second communication terminals over said computer network.

20. A communication control system comprising a remotely controlling center and a remotely controlled terminal, said remotely controlling center controlling said remotely controlled terminal via a computer network, said remotely controlling center comprising:

means for requesting connection to said computer network via first telephone line in order to acquire a first computer network address of said remotely controlling center;

means for transmitting communication information including at least said first computer network address to said remotely controlled terminal via a second telephone line; and said remotely controlled terminal comprising:

means for requesting connection to said computer network, upon receipt of the information including said first address, via said first telephone line in order to acquire a second computer network address of said remotely controlled terminal;

means for outputting connection information including said first and said second computer network addresses onto said computer network to request communication with said remotely controlling center;

whereby communication is established between said remotely controlling center and said remotely controlled terminal over said computer network so that said remotely controlling center may remotely control said remotely controlled terminal.

* * * * *